Patented June 4, 1929.

1,715,417

UNITED STATES PATENT OFFICE.

FREDERICK H. KRANZ, OF BUFFALO, NEW YORK, ASSIGNOR TO NATIONAL ANILINE & CHEMICAL CO., INC., OF NEW YORK, N. Y., A CORPORATION OF NEW YORK.

MANUFACTURE OF HYDROXYBENZALDEHYDES.

No Drawing.   Application filed May 7, 1926. Serial No. 107,492.

This invention relates to the manufacture of hydroxybenzaldehydes, more particularly meta-hydroxybenzaldehyde and ortho-hydroxybenzaldehyde.

In the preparation of meta-hydroxybenzaldehyde, it has heretofore been proposed to nitrate benzaldehyde, separate meta-nitrobenzaldehyde from the product thus obtained, reduce the purified meta-nitrobenzaldehyde or its bisulfite compound to meta-aminobenzaldehyde or its bisulfite compound, and subsequently diazotize the meta-aminobenzaldehyde or its bisulfite compound and decompose the diazo compound by hydrolysis to form meta-hydroxybenzaldehyde.

In the nitration of benzaldehyde, it is well known that there is ordinarily produced a mixture of nitro compounds comprised chiefly of meta-nitrobenzaldehyde (about 75 to 85 percent) and ortho-nitrobenzaldehyde (about 15 to 25 percent). It is further known that a complete separation of meta- and ortho-nitrobenzaldehydes from each other in mixtures containing them is difficult, if not substantially impossible, to accomplish. Consequently, the production of meta-hydroxybenzaldehyde by prior processes is unsatisfactory as regards yields and quality of product.

According to the present invention, a mixture of aminobenzaldehydes, or their bisulfite compounds, obtainable by reducing a crude nitrated benzaldehyde (being a mixture of different isomeric nitrobenzaldehydes, chiefly meta- and ortho-nitrobenzaldehydes), or its bisulfite compound, is diazotized and the diazotized product subjected to decomposition by ordinary or by steam distillation. The ortho-hydroxybenzaldehyde, which is produced, distils from the mixture while the meta-hydroxybenzaldehyde is in the liquor which remains behind. Both the ortho- and meta-hydroxybenzaldehydes are separately collected and may be recovered in any suitable or well-known manner.

The following example will serve to further illustrate the invention, but it is understood that the invention is not limited thereto. The parts are by weight.

*Example.*—10 parts of crude nitrobenzaldehyde (a mixture of nitrobenzaldehydes containing about 80 to 85 percent of meta-nitrobenzaldehyde and 15 to 20 percent ortho-nitrobenzaldehyde and obtained, for example, by nitrating at a temperature of about 0° C., 10 parts of benzaldehyde with about 35 parts of mixed acid containing about 80–82 percent sulfuric acid, 18–20 percent nitric acid, and 0.5–1.0 percent water, pouring the nitration mixture into ice and water, separating the oil, which comprises the crude nitrobenzaldehyde, and washing it well with a dilute sodium carbonate solution and water until substantially neutral) are dissolved in about 8 parts of sodium bisulfite and 25 to 35 parts water, the solution diluted by the further addition of about 65 to 75 parts of water, and then added to an aqueous mixture of iron and hydrochloric acid, or an equivalent amount of sulfuric acid, at a temperature between about 60° C. and 90° C., the amount of iron (about 15 to 17 parts) being sufficient to effect the complete reduction of the nitro bodies to the corresponding amino bodies, the amount of hydrochloric acid (about 1.3 to 1.5 parts of 20° Bé.) being about 2 to 5 percent of that required to dissolve the total iron present, and the strength of the hydrochloric acid present not exceeding about 1 percent. When the reduction is complete, the reaction mixture is neutralized or made slightly alkaline by the addition of caustic soda solution and the solution filtered hot, i. e., about 85°–90° C. The filtrate, which contains the bisulfite compounds of the aminobenzaldehydes in solution, is rapidly cooled to about 0° and diazotized. For this purpose, sufficient 50° Bé. sulfuric acid is added to give about a 10 percent sulfuric acid solution, the temperature of the solution being maintained around 0° C., and the solution diazotized by the addition of a concentrated solution of sodium nitrite. About 5 to 6 parts of sodium nitrite are usually required for complete diazotization. After stirring for about an hour, the resulting diazotized solution is slowly added to a distilling apparatus containing about 40 parts of 10 to 15 percent sulfuric acid maintained at the boiling temperature. In this manner, the diazo solution is decomposed and the ortho-hydroxybenzaldehyde which is formed is carried over into the distillate, which is collected, while the meta-hydroxybenzaldehyde remains behind in the acid liquor. The ortho-hydroxybenzaldehyde is collected from the distillate and the meta-hydroxybenzaldehyde from the residual acid liquor in any suitable manner. For example, the hot residual acid liquor may be filtered, and common salt added to saturation to the filtrate. Upon cooling, meta-hydroxybenzaldehyde crystallizes out and may be filtered off. The ortho-hydroxybenzaldehyde may be extracted from the distillate by means of any suitable solvent and recovered. It may be purified in any suitable manner. Very little, if any, anthranil is present.

Although the preferred procedure is illustrated in the above example, it will be understood that the mixture of isomeric nitrobenzaldehydes or of isomeric aminobenzaldehydes may be produced and obtained in any suitable or well known manner. For example, the mixed nitrobenzaldehydes may be obtained by nitrating benzaldehyde with nitric acid alone, or with a mixture of sulfuric acid and nitric acid or a mixture of an inorganic nitrate and sulfuric acid. The mixture of nitrobenzaldehydes may be reduced to the corresponding aminobenzaldehydes in any suitable manner, for example, by means of iron or other metal in the presence of a small amount or an excess of acid, or by means of sodium bisulfite or by sodium hydrosulfite, etc. The invention primarily contemplates avoiding a separation of the mixed isomeric nitrobenzaldehydes or the aminobenzaldehydes, and is directed chiefly to the production and separation of meta-hydroxybenzaldehyde, and secondarily to ortho-hydroxybenzaldehyde, indirectly from crude or mixed nitrobenzaldehydes and directly from crude or mixed aminobenzaldehydes by diazotization, and subsequent decomposition and separation by distillation in a current of steam or otherwise. In this way, meta- and ortho-hydroxybenzaldehydes are separately obtained in good yields and of excellent quality.

While boiling dilute sulfuric acid is the preferred medium for decomposing the diazo bodies of the aminobenzaldehydes, other acids, or even salt solutions, may be used. The strength of the dilute sulfuric acid is preferably about 10 to 15 percent, but an acid of any strength not to exceed about 60 percent can be employed.

I claim:

1. A process of producing meta- and ortho-hydroxybenzaldehydes which comprises reducing a crude nitrated benzaldehyde, diazotizing the amino bodies thus produced, distilling the diazo product in the presence of water, and recoving the meta-hydroxybenzaldehyde from the residue in the distilling apparatus and the ortho-hydroxybenzaldehyde from the distillate.

2. A process of producing meta- and ortho-hydroxybenzaldehydes which comprises diazotizing a mixture of aminobenzaldehydes, distilling the resulting diazo product in the presence of water, and recovering the meta-hydroxybenzaldehyde from the residual liquor in the distilling apparatus and the ortho-hydroxybenzaldehyde from the distillate.

3. In the production of meta- and ortho-hydroxybenzaldehydes, a process which comprises diazotizing bisulfite compounds of isomeric aminobenzaldehydes in admixture in aqueous solution, distilling the resulting admixture of diazo products in the presence of dilute sulfuric acid, and recovering the meta-hydroxybenzaldehyde from the residual acid liquor and the ortho-hydroxybenzaldehyde from the distillate.

4. In the production of meta-hydroxybenzaldehyde, a process which comprises diazotizing a mixture of isomeric aminobenzaldehydes containing meta-aminobenzaldehyde, adding the diazo solution to boiling dilute sulfuric acid, and distilling off the ortho-hydroxybenzaldehyde which may be present.

5. A process of producing meta- and ortho-hydroxybenzaldehydes which comprises reducing a crude nitrated benzaldehyde in an aqueous solution of sodium bisulfite by means of iron and a small amount of hydrochloric acid, subsequently neutralizing and filtering the reaction-mixture, cooling and diazotizing the filtrate, adding the resulting diazo solution to boiling dilute sulfuric acid and distilling off the ortho-hydroxybenzaldehyde produced, and recovering meta-hydroxybenzaldehyde from the residual liquor.

6. In the production of meta-hydroxybenzaldehyde, a process which comprises diazotizing a mixture of isomeric aminobenzaldehydes in aqueous sodium bisulfite solution, subjecting the resulting diazo solution to distillation in the presence of sulfuric acid to remove orthro-hydroxybenzaldehyde, and recovering meta-hydroxybenzaldehyde from the residual liquor.

7. In the production of meta- and ortho-hydroxybenzaldehydes, the step which comprises subjecting an aqueous solution containing meta- and ortho-diazobenzaldehydes to distillation in the presence of sulfuric acid.

8. In the production of meta-hydroxybenzaldehyde, a process which comprises diazotizing a mixture of isomeric aminobenzaldehydes containing meta-aminobenzaldehyde, subjecting the resulting mixture to decomposition and distillation in a current of steam, and recovering meta-hydroxybenzaldehyde from the residual liquor.

In testimony whereof I affix my signature.

FREDERICK H. KRANZ.